(12) United States Patent
Yazdandoost et al.

(10) Patent No.: US 10,133,904 B2
(45) Date of Patent: Nov. 20, 2018

(54) FULLY-ADDRESSABLE SENSOR ARRAY FOR ACOUSTIC IMAGING SYSTEMS

(71) Applicant: Apple Inc., Cupertino, CA (US)

(72) Inventors: Mohammad Yeke Yazdandoost, Cupertino, CA (US); Jean-Marie Bussat, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/822,614

(22) Filed: Aug. 10, 2015

(65) Prior Publication Data

US 2016/0092714 A1 Mar. 31, 2016

Related U.S. Application Data

(60) Provisional application No. 62/057,929, filed on Sep. 30, 2014.

(51) Int. Cl.
| | |
|---|---|
| *G06F 3/043* | (2006.01) |
| *G06K 9/00* | (2006.01) |
| *G06F 1/16* | (2006.01) |
| *G06F 3/041* | (2006.01) |
| *G06F 21/00* | (2013.01) |

(52) U.S. Cl.
CPC ......... *G06K 9/0002* (2013.01); *G06F 1/1626* (2013.01); *G06F 1/1684* (2013.01); *G06F 3/0416* (2013.01); *G06F 3/0436* (2013.01); *G06F 21/00* (2013.01)

(58) Field of Classification Search
CPC ..... G06K 9/0002; G06F 3/0436; G06F 3/043; G06F 3/0433
See application file for complete search history.

(56) References Cited

U.S. PATENT DOCUMENTS

| | | | |
|---|---|---|---|
| 4,729,128 | A | 3/1988 | Grimes |
| 5,162,618 | A | 11/1992 | Knowles |
| 5,381,696 | A | 1/1995 | Ichinose |
| 5,515,298 | A | 5/1996 | Bicz |
| 5,589,636 | A | 12/1996 | Bicz |
| 5,719,950 | A | 2/1998 | Osten |
| 5,886,452 | A | 3/1999 | Toda |
| 6,091,406 | A | 7/2000 | Kambara |
| 6,159,149 | A | 12/2000 | Erikson |
| 6,164,135 | A | 12/2000 | Bicz |
| 6,720,712 | B2 | 4/2004 | Scott |
| 7,032,454 | B2 | 4/2006 | Amano |
| 7,400,750 | B2 | 7/2008 | Nam |
| 7,458,268 | B2 | 12/2008 | Schneider et al. |
| 7,497,120 | B2 | 3/2009 | Schneider et al. |

(Continued)

FOREIGN PATENT DOCUMENTS

| | | |
|---|---|---|
| WO | WO 94/002911 | 2/1994 |

*Primary Examiner* — Dennis Joseph (74) *Attorney, Agent, or Firm* — Brownstein Hyatt Farber Schreck, LLP (57) ABSTRACT

An acoustic imaging system can contain a plurality of individual acoustic elements that each contain an acoustic transducer, drive circuitry, and low voltage sense and/or read circuitry. In many embodiments both the drive circuitry and the read circuitry can be independently addressable. For example, if the individual acoustic elements are arranged into rows and columns, each acoustic element can include row/column drive circuit enable switches and row/column read circuit enable switches.

19 Claims, 6 Drawing Sheets

(56) References Cited

U.S. PATENT DOCUMENTS

| | | |
|---|---|---|
| 7,568,391 B2 | 8/2009 | Schneider et al. |
| 7,656,932 B2 | 2/2010 | Durand |
| 7,667,374 B2 | 2/2010 | Aono et al. |
| 7,734,435 B2 | 6/2010 | Thomas et al. |
| 7,739,912 B2 | 6/2010 | Schneider et al. |
| 7,770,456 B2 | 8/2010 | Stevenson et al. |
| 8,047,995 B2 | 11/2011 | Wakabayashi et al. |
| 8,054,203 B2 | 11/2011 | Breed et al. |
| 8,085,998 B2 | 12/2011 | Setlak et al. |
| 8,095,328 B2 | 1/2012 | Thomas et al. |
| 8,179,678 B2 | 5/2012 | Yamashita et al. |
| 8,201,739 B2 | 6/2012 | Schneider et al. |
| 8,335,356 B2 | 12/2012 | Schmitt |
| 8,345,508 B2 | 1/2013 | Wodnicki et al. |
| 8,508,103 B2 | 8/2013 | Schmitt et al. |
| 8,536,465 B2 | 9/2013 | Hagiwara et al. |
| 8,576,202 B2 | 11/2013 | Tanaka et al. |
| 8,601,876 B2 | 12/2013 | Schneider et al. |
| 8,617,078 B2 | 12/2013 | Machida et al. |
| 8,666,126 B2 | 3/2014 | Lee et al. |
| 8,692,812 B2 | 4/2014 | Hecht |
| 8,724,869 B2 | 5/2014 | Schneider et al. |
| 8,781,180 B2 | 7/2014 | Schneider et al. |
| 8,791,792 B2 | 7/2014 | Benkley, III |
| 9,044,171 B2 | 6/2015 | Venkatraman et al. |
| 9,056,082 B2 | 6/2015 | Liautaud et al. |
| 9,100,034 B2 | 8/2015 | Oshima |
| 9,132,693 B2 | 9/2015 | Klootwijk et al. |
| 9,170,668 B2 | 10/2015 | Schneider et al. |
| 9,201,546 B2 | 12/2015 | Son et al. |
| 9,276,625 B2 | 3/2016 | Kim et al. |
| 9,323,393 B2 | 4/2016 | Djordjev et al. |
| 9,465,972 B2 | 10/2016 | Chung et al. |
| 9,568,315 B2 | 2/2017 | Naoka, II et al. |
| 9,607,203 B1 | 3/2017 | Yazdandoost et al. |
| 9,613,246 B1 | 4/2017 | Gozzini et al. |
| 9,747,988 B2 | 8/2017 | Yazdandoost et al. |
| 9,778,193 B2 | 10/2017 | Vacca |
| 9,824,254 B1 | 11/2017 | Yazdandoost et al. |
| 9,904,836 B2 | 2/2018 | Yazdandoost et al. |
| 9,952,095 B1 | 4/2018 | Hotelling et al. |
| 9,979,955 B1 | 5/2018 | Guo |
| 9,984,271 B1 | 5/2018 | King et al. |
| 2003/0102777 A1 | 6/2003 | Kuniyasu et al. |
| 2003/0109993 A1 | 6/2003 | Peat et al. |
| 2004/0140735 A1 | 7/2004 | Scott et al. |
| 2004/0264746 A1 | 12/2004 | Polcha |
| 2006/0196271 A1 | 9/2006 | Jancsik et al. |
| 2008/0142571 A1 | 6/2008 | Yokozuka et al. |
| 2008/0175450 A1 | 7/2008 | Scott |
| 2009/0167704 A1 | 7/2009 | Terlizzi et al. |
| 2011/0227862 A1* | 9/2011 | Lim ................ G06F 3/044 345/174 |
| 2012/0092026 A1 | 4/2012 | Liautaud et al. |
| 2013/0015868 A1* | 1/2013 | Peng ................ G06F 3/044 324/688 |
| 2014/0333328 A1 | 11/2014 | Nelson et al. |
| 2014/0352440 A1 | 12/2014 | Fennell et al. |
| 2014/0355381 A1 | 12/2014 | Lal et al. |
| 2014/0359757 A1 | 12/2014 | Sezan et al. |
| 2015/0053006 A1 | 2/2015 | DeCoux et al. |
| 2015/0185898 A1 | 7/2015 | Masson et al. |
| 2015/0189136 A1 | 7/2015 | Chung et al. |
| 2015/0192547 A1 | 7/2015 | Lee et al. |
| 2015/0358740 A1 | 12/2015 | Tsai et al. |
| 2016/0063300 A1* | 3/2016 | Du ................ G06K 9/00033 382/124 |
| 2016/0117541 A1* | 4/2016 | Lu ................ G06K 9/0002 382/124 |
| 2016/0246396 A1 | 8/2016 | Dickinson et al. |
| 2016/0350573 A1 | 12/2016 | Kitchens, II et al. |
| 2017/0053151 A1 | 2/2017 | Yazdandoost et al. |
| 2017/0357839 A1 | 12/2017 | Yazdandoost et al. |

* cited by examiner

FULLY-ADDRESSABLE SENSOR ARRAY FOR ACOUSTIC IMAGING SYSTEMS

CROSS-REFERENCE TO RELATED APPLICATIONS

This application is a nonprovisional patent application of and claims the benefit to U.S. Provisional Patent Application No. 62/057,929, filed Sep. 30, 2014 and titled "Fully-Addressable Sensor Array for Acoustic Imaging Systems," the disclosure of which is hereby incorporated by reference herein in its entirety.

FIELD

This disclosure relates generally to imaging systems, and more particularly, to systems and methods for operating an acoustic imaging system as a biometric sensor for an electronic device.

BACKGROUND

An electronic device can include a biometric sensor to establish a user's identity. A fingerprint imaging system is one example of a biometric sensor. In many cases, the performance of a biometric sensor may be affected by the precision with which biometric data can be detected. Although increased precision may lead to improved security for the electronic device, it may also result in a physical reduction in the size of one or more components of the sensor. For example, a high-precision fingerprint imaging system may require smaller imaging components than low-precision fingerprint imaging systems.

The quality of a signal obtained from physically smaller components is often negatively affected by the components' smaller size. For example, small imaging sensors may detect less image information than large imaging sensors, generating lower-amplitude signals that may be more sensitive to interference. In other cases, small imaging sensors may be more susceptible to signal distortion from environmental conditions (e.g., temperature, pressure, humidity, and so on) than larger imaging sensors.

To account for the lower signal quality that may be associated with smaller components, many biometric sensors may require advanced signal processing, which may undesirably increase the power consumption and/or complexity of an electronic device incorporating the same.

SUMMARY

Embodiments described herein take the form of a sensor of an acoustic imaging system. The sensor can include both drive circuitry and sense circuitry. In some examples, the drive circuitry can be configured to operate at high voltage (e.g., 100 volts) and the sense circuitry can be configured to operate at low voltage (e.g., less than 5 volts).

An acoustic imaging system includes an imaging sensor. The imaging sensor is defined by an array of sensors, each of which is associated with an independent drive circuit and an independent sense circuit. Thus, each sensor of the array of sensors can be independently driven and independently read.

The drive circuit of each sensor can be configured to operate at high voltage (e.g., 100 volts) and the sense circuit of each sensor of the array of sensors can be configured to operate at low voltage (e.g., less than 5 volts). In other cases, the drive circuit can operate at the same or substantially the same voltage as the sense circuit.

Some embodiments reference a method of reading an acoustic element with an addressable read circuit and an addressable drive circuit, the method including at least the operations of enabling each of a row and column select switch associated with a read mode of the acoustic element to couple the read circuit to a low voltage source, and obtaining an electrical signal from the acoustic element.

Some embodiments described herein reference a method of driving an acoustic element with a drive circuit and a read circuit, the method including at least the operations of enabling each of a row and column select switch associated with a drive mode of the acoustic element to couple the drive circuit to a voltage source, and driving an acoustic transducer with a voltage signal.

Some embodiments described herein reference an acoustic imaging sensor including at least a drive voltage node (e.g., high or low voltage), a sense voltage node (e.g., low voltage), a plurality of acoustic elements electrically arranged into a plurality of rows and a plurality of columns. Each acoustic element can include an acoustic transducer with a drive mode (in which the acoustic transducer produces an acoustic pulse in response to a first electronic signal), and a sense mode (in which the acoustic transducer produces a second electronic signal in response to receiving an acoustic pulse and/or mechanical pressure). Each acoustic element can also include a first pair of switches (e.g., addressing switches) configured to couple the acoustic transducer in the drive mode to the drive voltage node through a row selected from the plurality of rows and a column selected from the plurality of columns, and a second pair of switches (e.g., addressing switches) configured to couple the acoustic transducer in the sense mode to the sense voltage node through the selected row the selected column, an addressing controller configured to selectively enable the first pair of switches associated with an acoustic element selected from the plurality of acoustic elements. In this manner, each acoustic element may be addressable in the drive mode and separately addressable in the sense mode.

BRIEF DESCRIPTION OF THE DRAWINGS

Reference will now be made to representative embodiments illustrated in the accompanying figures. It should be understood that the following descriptions are not intended to limit the disclosure to one preferred embodiment. To the contrary, each is intended to cover alternatives, modifications, and equivalents as may be included within the spirit and scope of the described embodiments as defined by the appended claims.

The use of the same or similar reference numerals in different drawings indicates similar, related, or identical items where appropriate.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

DETAILED DESCRIPTION

Embodiments described herein relate to methods and systems for operating acoustic imaging systems. Although many embodiments are described herein with reference to fingerprint imaging systems for use with portable electronic devices, it should be appreciated that some embodiments can take other forms and may be included within different form factors. Accordingly, it should be appreciated that the various embodiments described herein, as well as the functionality, operation, components, and capabilities thereof may be combined with other elements as necessary, and so any physical, functional, or operational discussion of an element or feature is not intended to be limited solely to a particular embodiment to the exclusion of others.

Many acoustic imaging systems described herein include a substrate with two parallel surfaces such as a top surface and a bottom surface. An array of acoustic transducers is arranged in a pattern and positioned near the bottom surface. In one mode, the acoustic imaging system causes the array to propagate an acoustic pulse toward the top surface to capture an image of an object engaging the top surface. This operation is referred to herein as "driving" the acoustic transducers. When the acoustic pulse reaches the top surface of the substrate, a portion of the acoustic pulse is reflected back towards the array of transducers, operating in a second mode. This operation is referred to herein as "sensing" or "reading" the acoustic transducers. The reflection is collected and an image of the top surface of the substrate, and thus the object engaging it, can be approximated.

More particularly, when an acoustic pulse reaches the top surface of the substrate, a portion of the pulse may be reflected back towards the acoustic transducers. The portion of the pulse that is reflected may depend upon an amount of acoustic impedance mismatch between the substrate and the object engaging it at a particular point of the substrate. Thereafter, the array of acoustic transducers can receive the reflection and generate an array or series electrical signals in response thereto. By analyzing the electrical signals, the acoustic imaging system can derive an image of the object engaging the top surface of the substrate.

For example, in one embodiment, the acoustic imaging system can be used to capture an image of a fingerprint. In this case, a ridge of the fingerprint presents a different acoustic impedance mismatch (e.g., tissue-substrate boundary) than a valley of the fingerprint (e.g., air-substrate boundary). In other words, ridges of the fingerprint reflect the acoustic pulse differently than valleys of the fingerprint and, thus, correspond to different electrical signals. By analyzing the electrical signals, an image of the fingerprint can be generated.

In some cases, the acoustic transducers can be formed from piezoelectric materials. In these cases, each acoustic transducer of the array of acoustic transducers can be formed from a material such as lead zircanate titinate, zinc oxide, aluminum nitride, or any other piezoelectric material. Piezoelectric materials may be selected for the speed with which the materials can expand or contract in response to an electrical stimulus.

However, in many cases, a piezoelectric acoustic transducer can have a high inherent capacitance. As a result, driving piezoelectric materials at high frequencies (e.g., ultrasonic frequencies) can induce current spikes that can irreparably damage components of the acoustic imaging system or other systems, circuits, or components circuits coupled thereto.

Accordingly, embodiments described herein relate to acoustic imaging systems configured to be driven at high frequencies, in a power-efficient manner, without generating potentially-damaging current spikes.

Figure 1:
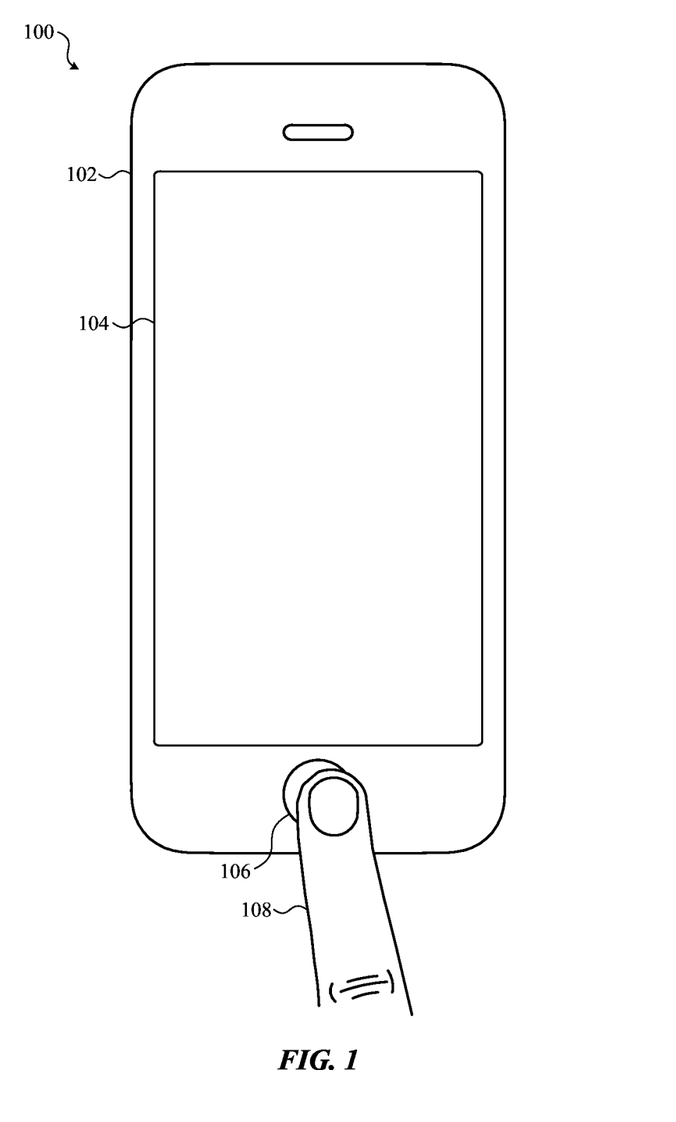
FIG. 1 depicts an example electronic device that can include an acoustic imaging system.

FIG. 1 depicts an example electronic device that can include an acoustic imaging system. In the present example, the electronic device 100 can be implemented as a portable electronic device such as a cellular phone. The electronic device 100 can include a housing 102 and a display 104. The display 104 can be disposed below a cover glass to protect the display 104 from damage. In many cases, the cover glass can be formed from an optically transparent and mechanically rigid material such as glass, sapphire, polycarbonate, and the like.

In many examples, the display 104 may include one or more of a variety of display elements. For example, the display 104 may include a liquid crystal display (LCD), a thin film transistor display (TFT), an organic light emitting diode display (OLED), organic electroluminescence (OEL) display, or other type of display. The display 104 may be used to present visual information to the user and may be operated in accordance with one or more display modes or the software applications being executed on the electronic device 100. In many cases, the display 104 can include or operate in conjunction with one or more touch input devices. For example, the display 104 may be configured to receive touch, gesture, and/or force input.

The electronic device 100 can also include one or more input elements such as a button 106. The button 106 may be a physical button such as a push button or switch. In other examples, the button 106 can be a touch input device that does not physically depress such as a capacitive button. In other cases, the button 106 can be a virtual button shown on the display 104.

In many embodiments, an acoustic imaging system (not shown) can be positioned below a portion of the cover glass that may regularly receive a user's touch input. For example, the acoustic imaging system can be positioned below the button 106. In this manner, each time the user 108 presses the button 106, the acoustic imaging system can be activated. Once an image of fingerprint of the user 108 is obtained by the acoustic imaging system, the obtained image can be compared to a database of known fingerprint images to determine if the obtained fingerprint image matches a known fingerprint image.

In some embodiments, the acoustic imaging system can be positioned below the display 104. For example, the acoustic imaging system can be positioned below the display element associated with the display 104. In other examples, the acoustic imaging system can be at least partially transparent and can be disposed above the display element associated with the display 104. In this manner, an image of a fingerprint may be obtained by touching any portion of the display 104.

In other examples, the acoustic imaging system can be positioned within the sidewall of the housing 102. In this manner, when a user grips the electronic device 100, an image can be obtained of one or more fingerprints or palm prints of the user. In still further examples, more than one acoustic imaging system can be included within the electronic device 100. For example, a first acoustic imaging system can be included below (or within) the button 106, and a second acoustic imaging system can be included below (or within) the display 104.

Figure 2A:
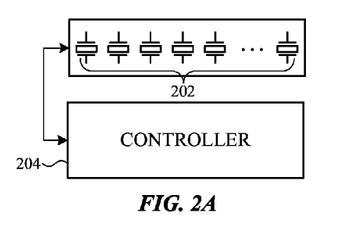
FIG. 2A depicts a simplified block diagram of an acoustic imaging system.

FIG. 2A depicts a simplified block diagram of an acoustic imaging system that can be used with the electronic device 100 of FIG. 1. The acoustic imaging system 200 can include one or more acoustic transducers 202. The acoustic transducers 202 can contract or expand rapidly in response to an electrical stimulus such as a voltage or current (e.g., electroacoustic transducer). For example, the acoustic transducers 202 can be formed, in certain embodiments, from a piezoelectric material such as lead zircanate titinate, zinc oxide, aluminum nitride, or any other piezoelectric material. In other examples, the acoustic transducers 202 may be formed as a component configured to rapidly expand, contract, or move in response to an electrical stimulus such as a voltage or current (e.g., voice coil, piezoelectric area, and so on).

In many embodiments, the acoustic transducers 202 can be configured for both emitting and detecting acoustic signals. In other words, an acoustic transducer of the one or more acoustic transducers 202 can be used to both transmit an acoustic pulse in response to an electrical stimulus and, in addition, can generate an electrical signal in response to an acoustic input. In many cases, an acoustic transducer of the one or more acoustic transducers 202 can take a particular shape. For example, in some embodiments an acoustic transducer can take a substantially rectilinear shape such as a square or rectangle. In some embodiments, an acoustic transducer can take a circular shape.

Figure 2B:
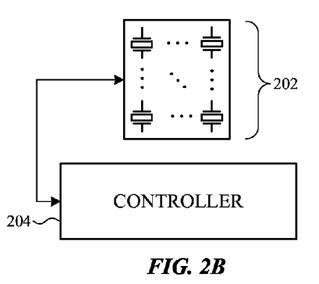
FIG. 2B depicts a simplified block diagram of another acoustic imaging system.

In many examples, the acoustic transducers 202 can be arranged in a pattern. For example, in some embodiments the acoustic transducers 202 can be arranged in an evenly spaced line such as illustrated in FIG. 2A. In some embodiments, the acoustic transducers 202 can be arranged in a grid, as shown in FIG. 2B. In some examples, the grid of the acoustic transducers 202 can be square or otherwise rectangular. In other examples, the grid of the acoustic transducers 202 can take other shapes, such as a circular pattern (not shown).

Although many embodiments described herein distribute the acoustic transducers 202 in a uniform pattern (e.g., matrix, square, line, circle, and so on), such uniformity is not necessarily required.

The acoustic transducers 202 can be coupled to a controller 204. The controller 204 can be configured to provide electrical energy to each acoustic transducer of the one or more acoustic transducers 202 independently. For example, the controller 204 can provide a first voltage to a first transducer and a second voltage to a second transducer. In addition, the controller 204 can control the duration and magnitude of the electrical energy applied to each independent acoustic transducer of the one or more acoustic transducers 202.

In many examples, the controller 204 can operate in one or more modes. In certain embodiments, the controller 204 can have an interrogation mode. In some embodiments and implementations, the interrogation mode can be referred to as an integration mode or a drive mode. Accordingly, as used herein, terms and phrases such as "integration mode", "drive mode", and "interrogation mode" may be understood to each refer to the same operational mode of an acoustic fingerprint imaging system. When in the interrogation mode, the controller 204 can be configured to provide electrical energy to one or more of the acoustic transducers 202 and in response, the acoustic transducers 202 can produce an acoustic output. In many embodiments, the electrical energy provided by the controller 204 can be an abbreviated electrical pulse. In response to the abbreviated electrical pulse, the one or more acoustic transducers 202 can produce a punctuated acoustic output.

After producing the abbreviated acoustic pulse, the controller 204 can transition into an imaging mode. In an imaging mode the controller 204 can couple to one or more acoustic transducers 202 and monitor for electrical signals therefrom that may be generated by the acoustic transducers 202 in response to receiving an acoustic signal (e.g., acoustic reflection). The controller 204 can, thereafter, analyze the obtained electrical signals and can approximate and/or derive an image therefrom.

Figure 2C:
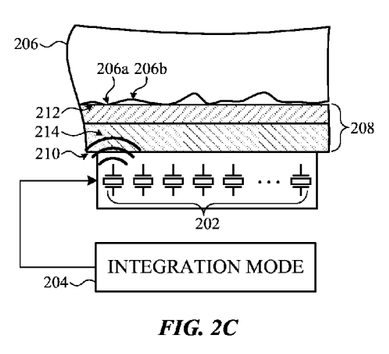
FIG. 2C depicts the acoustic imaging system of FIG. 2A emitting an acoustic pulse toward an imaging surface.

In many embodiments, the acoustic imaging system 200 can be disposed within a housing of an electronic device. For example, FIG. 2C depicts the acoustic fingerprint imaging system of FIG. 2A positioned below one or more layers of a substrate 208. As illustrated, the substrate 208 can have a bottom surface 210 and a top surface 212. The bottom surface 210 can be oriented to face the acoustic transducers 202, and the top surface 212 can be oriented to receive a user's finger 206, illustrated in simplified cross-section showing ridges and valleys of the user's fingerprint, such as the ridge 206a and the valley 206b. Although the bottom surface 210 and top surface 212 are shown as parallel, such a configuration may not be required in all embodiments.

As noted with respect to FIG. 1, the substrate 208 can be a portion of a display, a portion of an input device (e.g., button, switch, and so on), or a portion of the housing of the electronic device. Although illustrated as two separate layers of material, many embodiments can implement the substrate 208 as a single layer of material, or more than two layers of material. The substrate 208 can include active components (e.g., circuits, circuit traces, batteries, and so on) or passive components (e.g., glass sheet, metal sheet, and so on) or a combination thereof.

For example, if for a selected embodiment, the substrate 208 is a portion of the housing of an electronic device, the substrate 208 can be formed from one or more layers of metal, glass, ceramic, plastic, and so on. In some embodiments, if the substrate 208 is a portion of a cover glass disposed above a display, the substrate 208 can be an optically transparent material such as glass, sapphire, plastic, and so on. In other cases, the substrate 208 can include layers formed from more than one material. For example, if the substrate is a portion of a display, the substrate 208 can include a filter layer, a polarizing layer, a backlight layer, and so on.

The acoustic transducers 202 can be positioned below the substrate 208 so as to be in acoustic communication with the bottom surface 210. In many examples, the acoustic transducers 202 are adhered to (or formed onto or into) the bottom surface 210. In this manner, when an acoustic transducer of the one or more acoustic transducers 202 generates an acoustic output 214 in response to an activation signal from the controller 204 (when in the interrogation mode), the acoustic output 214 can propagate into the substrate 208 from the bottom surface 210 toward the top surface 212.

Figure 2D:
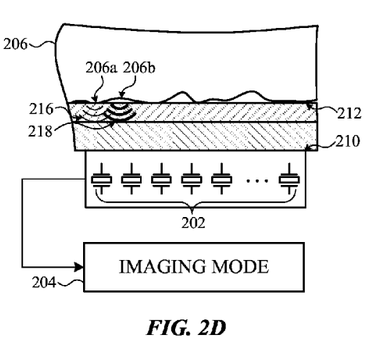
FIG. 2D depicts the acoustic imaging system of FIG. 2A receiving an acoustic reflection from an imaging surface.

Once the acoustic output 214 reaches the top surface 212, the controller 204 can transition into the imaging mode, such as depicted in FIG. 2D. When in the imaging mode, the controller 204 can be configured to receive and analyze an electrical signal from one or more of the acoustic transducers 202 that corresponds to a portion of an acoustic reflection of the acoustic output 214 (see, e.g., FIG. 2C).

For example, in many embodiments, the acoustic reflection from a particular location along the top surface 212 may depend upon whether that location is below a ridge 206a or a valley 206b. More particularly, the acoustic boundary between the substrate 208 and a ridge 206a (having an acoustic impedance of soft tissue) may cause a measurably smaller-amplitude acoustic reflection than the acoustic boundary between the substrate 208 and a valley 206b (having an acoustic impedance of air).

For example, the percent $P_{diff}$ of amplitude of an acoustic reflection as a result of an acoustic boundary between two materials $M_1$ and $M_2$, having an acoustic impedance $Z_1$ and $Z_2$ respectively may be modeled as:

$$P_{diff} = \frac{\frac{z_1}{z_2} - 1}{\frac{z_1}{z_2} + 1} \quad \text{Equation 1}$$

In this example, if the acoustic impedances $Z_1$ and $Z_2$ of the two materials are substantially equal, the amplitude of any acoustic reflection is minimal or zero. On the other hand, if one of the two acoustic impedances $Z_1$ or $Z_2$ is larger than the other, $P_{diff}$ approaches ±1.0. In many examples, the direction of the wave (e.g., from high impedance to low impedance medium or the reverse) can determine whether the amplitude will be inverted upon reflection.

As noted above, the amplitude of a reflection from a ridge-substrate acoustic boundary may be a smaller than the amplitude of a reflection from a valley-substrate acoustic boundary. In other words, the amplitude of an acoustic reflection 216 from an area of the top surface 212 that is below a ridge 206a may be less than the amplitude of an acoustic reflection 218 from an area of the top surface 212 that is below a valley 206b. Accordingly, the controller 204, when in an imaging mode, can monitor the amplitude of an acoustic reflection to derive, determine, assemble, or create, an image of the ridges and valleys of a user's fingerprint. As illustrated, the differences in the thickness of the lines depicting the acoustic reflection 218 and the acoustic reflection 216 is intended to indicate a difference in amplitude between the acoustic reflection affected by a ridge and an acoustic reflection affected by a valley of a fingerprint.

In many cases, the quality of the approximated image may be directly affected by attenuation of the acoustic reflection. For example, an acoustic output 214 may not propagate through the substrate 208 uniformly and as a result, the acoustic reflection(s) 216, 218 and the image approximated therefrom can be distorted.

To mitigate the effects of reflection attenuation that may result from activation of a single acoustic transducer of the one or more acoustic transducers 202 such as shown in FIG. 2C, the acoustic imaging system 200 can be configured to cause (via the controller 204) the acoustic transducers 202 to propagate a plane wave acoustic output 220 into the substrate 208. The plane wave can thereafter be reflected from the top surface 212 as a planar acoustic reflection 222. As may be appreciated, a plane wave (across certain distances) can propagate along a vector without substantially propagating in other directions. In this manner, the amplitude of the plane wave acoustic output 220 when it reaches the top surface 212 may be greater than the amplitude of the acoustic output 214 that propagates spherically.

Accordingly, many embodiments can be configured to propagate plane waves to obtain a high-quality image of a fingerprint. For example, as noted above, certain embodiments include an array of acoustic transducers arranged in a pattern (e.g., grid, matrix, and so on) and positioned along the bottom surface of the substrate. To capture an image of an object engaging the top surface (e.g., fingertip, stylus tip, and so on), the imaging system can cause a selected subarray of the array to propagate a plane wave normal to the bottom surface and toward the object in order to monitor for any acoustic signals reflected therefrom.

In other examples, plane waves may not be required. For example, certain embodiments can be configured to activate and/or drive individual acoustic transducers or groups of acoustic transducers with a particular waveform such as a sine wave, square wave, triangular wave, chirp wave, and so one. In many cases, the waveform applied to drive the individual acoustic transducers or groups of acoustic transducers can terminate at zero volts.

Figure 3A:
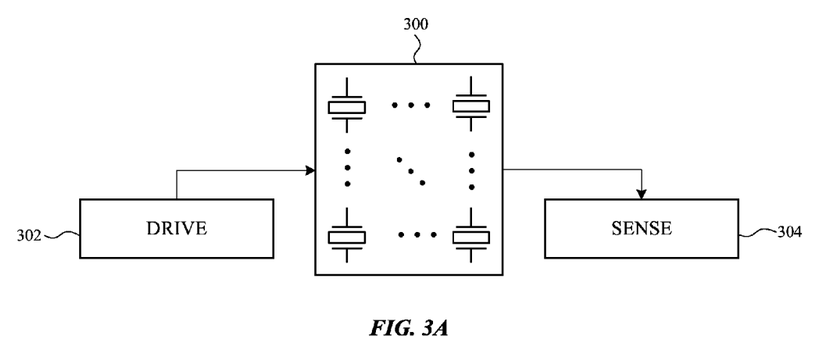
FIG. 3A depicts a simplified block diagram of an acoustic imaging system.

FIG. 3A depicts a simplified block diagram of an acoustic imaging system. An acoustic transducer array 300 can include two or more acoustic transducers. For example, in some embodiments the acoustic transducer array 300 can include an N×M array of individual transducers.

A drive circuit 302 couples to the acoustic transducer array 300. In one embodiment, the drive circuit 302 can include at least one drive voltage electrode, a voltage buffer, and at least one switch. The drive circuit 302 can be configured to deliver a particular voltage ("drive voltage") to one or more transducers of the acoustic transducer array 300. In some cases, the drive voltage may be a high voltage such as 100 volts, although this is not required. In other cases, the drive voltage may be low voltage such as 3.3 or 5 volts.

In some cases, the drive circuit 302 can be implemented as a plurality of drive circuits. For example, in such an embodiment, each individual transducer of the acoustic transducer array 300 can be coupled to a respective one drive circuit. In these embodiments, the drive circuit 302 can be disposed adjacent to the acoustic transducer associated therewith. In other words, the drive circuit can be formed within the same area as the acoustic transducer with which it is associated. Such a configuration is generally referred to herein as an "in-element drive circuit."

In another example, a single drive circuit can be coupled to a subset or subarray of acoustic transducers of the acoustic transducer array 300. In these and related embodiments, adjacent transducers (and/or all transducers of the acoustic transducer array 300) can share one or more electrodes associated with the drive circuit 302.

A sense circuit 304 couples to the acoustic transducer array 300. A sense circuit can include an amplifier and at least one switch. The sense circuit 304 can be configured to receive a particular voltage signal ("sense voltage") from one or more transducers of the acoustic transducer array 300. As with the drive circuit 302, in some cases, the sense circuit 304 can be implemented as a plurality of individual sense circuits. For example, in such an embodiment, each individual transducer of the acoustic transducer array 300 can be coupled to a respective one sense circuit. In these embodiments, the sense circuit 304 can be disposed adjacent to the acoustic transducer associated therewith. In other words, the sense circuit can be formed within the same area as the acoustic transducer with which it is associated. Such a configuration is generally referred to herein as an "in-element sense circuit."

In another example, a single sense circuit can be coupled to a subset or subarray of acoustic transducers of the acoustic transducer array 300. In these and related embodiments, adjacent transducers (and/or all transducers of the acoustic transducer array 300) can share one or more electrodes associated with the sense circuit 304.

Some embodiments described herein can implement both in-element drive circuits and in-element sense circuits. In these embodiments, an individual acoustic transducer can be both driven and read independently of other acoustic transducers of the acoustic transducer array 300. In this manner, the acoustic transducer array 300 can be driven and read in segments. In this manner, the power required to capture an image with the acoustic transducer array 300 can be substantially reduced along with the risk of spikes in voltage or current. Such an embodiment is referred to herein as a fully-addressable acoustic imaging system.

Figure 3B:
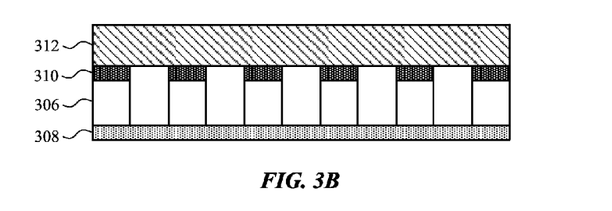
FIG. 3B depicts a simplified diagram of an acoustic imaging system showing a series of individually addressable acoustic transducers.

FIG. 3B depicts a simplified cross-section diagram of an acoustic fingerprint imaging system showing a series of acoustic transducers sharing one or more electrodes. Depicted are six independent transducers 306 that share a shared electrode 308.

In certain embodiments, the shared electrode 308 can be a ground electrode, although this configuration is not required and can be, in certain embodiments, a voltage and/or power supply electrode. As illustrated, each of the independent transducers 306 are electrically coupled to the shared electrode 308. In some embodiments, the independent transducers 306 can be coupled to the shared electrode 308 by soldering. In some embodiments, the shared electrode 308 can be formed, layered, or otherwise disposed atop the independent transducers 306 in a manufacturing process. In some cases, the shared electrode 308 can be an optically transparent electrode, formed from a material such as indium tin oxide.

In further embodiments, the independent transducers 306 can be coupled to the shared electrode 308 by an electrically conductive adhesive.

Positioned above the independent transducers 306 can be a series of individual electrodes 310 that can couple the independent transducers 306 to a single sense/drive chip 312. In other embodiments, the sense/drive chip 312 can be positioned below the independent transducers 306.

The sense/drive chip 312 can be configured for both high voltage operation and low voltage operation, although such a configuration is not required of all embodiments. For example, in one embodiment, the sense/drive chip 312 is configured for high voltage driving of the independent transducers 306 and low voltage sensing of the independent transducers 306. In another embodiment, the sense/drive chip 312 is configured for low voltage driving and low voltage sensing. In still further embodiments, the sense/drive chip 312 is configured for both high voltage drive and high voltage sense.

In this manner, in some embodiments, the sense/drive chip 312 can be manufactured with both high-voltage-tolerant components and low-voltage-tolerant components. In many cases, low-voltage-tolerant components may be more sensitive to low voltage signals but may be damaged by high voltage signals. High-voltage-tolerant components may be less sensitive to low voltage signals (e.g., small changes in voltage), and therefore more sensitive to noise.

In such embodiments, the low-voltage-tolerant components can be protected from damage caused by high voltage using one or more isolation and/or voltage biasing methods. For example, in one embodiment, low-voltage-tolerant components can be physically isolated from high voltage via one or more switches enabled while high-voltage-tolerant components are operating. In another embodiment, a ground node of the low-voltage-tolerant components can be biased upwardly while high-voltage-tolerant components are operating such that the potential difference between the low-voltage-tolerant components' ground and the high voltage required by the high-voltage-tolerant components is within the tolerance range of the low-voltage-tolerant components. Such a process is generally referred to herein as "ground shifting" of low-voltage-tolerant components.

When operating in a drive mode, the sense/drive chip 312 can provide a high voltage (e.g., 100 volts) signal to one or more of the independent electrodes 310 which can, in turn, excite the respective one or more independent transducers 306. In this mode, the largest potential difference between the sense/drive chip 312 and the shared electrode 308 can be a high voltage such as 103.3 volts (as one example). During this operation, low-voltage-tolerant components within the sense/drive chip 312 can be ground shifted to 100 volts. In this manner, the largest potential difference across low-voltage-tolerant components within the sense/drive chip 312 can be 3.3 voltage (as one example).

In many cases, the sense/drive chip 312 can include one or more sense and drive circuits dedicated to each independent transducer 306. In this manner, each of the acoustic transducers 306 can be "active elements" of the acoustic imaging sensor, configured to operate in both a drive mode and operating in a sense mode independent of the drive or sense modes of other acoustic transducers. Conversely, certain embodiments may not include shared drive circuitry and/or shared sense circuitry.

Figure 3C:
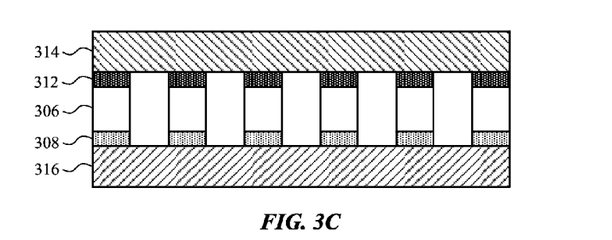
FIG. 3C depicts another simplified diagram of an acoustic imaging system showing a series of individually addressable acoustic transducers.

FIG. 3C depicts a simplified cross-section diagram of another acoustic imaging system having individually addressable acoustic transducers. Depicted are six independent transducers 306. The independent transducers can be coupled to a drive circuitry 314 and to a sense circuitry 316.

When in a drive mode, the drive circuitry 314 can be configured to provide a voltage signal to one or more of the independent transducers 306. In response, the one or more independent transducers 306 can output an acoustic pulse. When in a sense mode, the drive circuitry 314 can be disabled (e.g., grounded), although this is not required of all embodiments. In many embodiments, the independent transducers 306 couples to the drive circuitry 314 by a series of electrodes 312. For example, in one embodiment, the drive circuitry 314 can provide a voltage signal to one or more of the independent electrodes 312 which can, in turn, excite the respective one or more independent transducers 306. In other words, the drive circuitry 314 can, via the electrodes 312, independently control each independent transducer 306.

Additionally, the independent transducers 306 can be coupled to a sense circuitry 316. When in a sense mode, the sense circuitry 316 can be configured to receive a voltage signal from one or more of the independent transducers 306. In many embodiments, the independent transducers 306 can be coupled to the sense circuitry 316 by a series of individual electrodes 318.

In many embodiments both the drive circuitry 314 and the sense circuitry 316 can include one or more sense and drive circuits respectively devoted to each independent transducer 306.

In many embodiments, a reset signal can be applied by either the drive circuitry 314, the sense circuitry 316, or by a separate reset circuitry (not shown) to facilitate a transition from the drive mode to the sense mode.

Figure 4A:
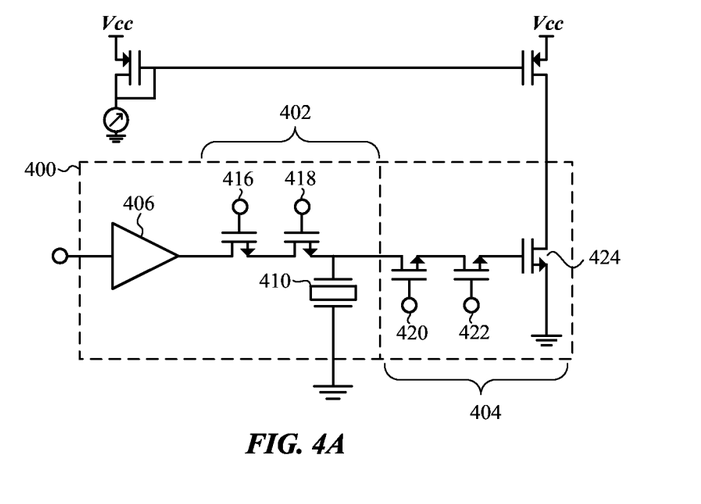
FIG. 4A depicts a simplified schematic diagram of an acoustic sensor.

FIG. 4A depicts a simplified schematic diagram of an acoustic sensor, such as the acoustic sensor depicted in FIG. 3B. The acoustic sensor 400 can include a drive portion 402 and a sense portion 404. The drive portion 402 can be configured to receive a voltage signal (e.g., high voltage) from an external voltage source through a voltage buffer. The drive portion 402 can also be coupled to row and column drive switches 416, 418 (respectively).

As noted with respect to other embodiments described herein, the illustrated embodiment depicts a simplified schematic diagram of an active acoustic sensor configured to operate in a drive and a sense mode independent of other elements within an array (e.g., one-dimensional row) of acoustic sensors. As a result, driving and sensing with the acoustic sensor may be more power efficient than conventional implementations that may simultaneously drive or sense with entire rows or columns of acoustic elements. As may be appreciated, these conventional row-wise drive and sense configurations may also generate substantial capacitance.

In the illustrated embodiment, the acoustic sensor can be configured to operate in both high voltage and low voltage modes although this is not necessarily required and other embodiments may have different voltage requirements or configurations. In the illustrated embodiment, a high voltage mode may be associated with a drive operation and a low voltage mode may be associated with a sense operation. In many cases, two modes may be required as a result of the high voltage required to operate a particular acoustic transducer in a drive mode and the low voltage output from that same acoustic transducer when operating in the sense mode.

As illustrated, the acoustic sensor 400 can include a drive portion 402 and a sense portion 404. In these embodiments, transistors and/or other components associated with the drive portion 402 can be manufactured to tolerate and/or operate in high voltage conditions. Similarly, transistors and/or other components associated with the sense portion 404 can be manufactured to tolerate and/or operate in lower voltage conditions.

In one embodiment, the drive portion 402 can be configured to receive a high voltage signal from a voltage source, for example shown as a buffer 406. The buffer 406 can be implemented in any number of suitable ways, such as with a back-to-back inverter pair. In some cases, each acoustic sensor of an array of acoustic sensors can be associated with one respective buffer 406. In other words, each acoustic element can have a dedicated voltage buffer associated therewith. In other embodiments, a single buffer 406 can be associated with a subset of acoustic sensors within an array of acoustic elements. In other embodiments, other buffer connection topologies can be implemented.

In many embodiments, the high voltage signal received from the buffer 406 can be a constant voltage signal. In other examples, the high voltage signal can be a varying voltage signal. In still further examples, the high voltage signal can be an alternating current signal. In many embodiments, the high voltage signal may be selected so that the high voltage signal terminates with zero volts.

As noted above, the acoustic sensor 400 can be one of many individual sensors defining an acoustic imaging array. Accordingly, the row and column drive switches 416, 418 can be selected in order to independently address a particular sensor from the array of many individual sensors. The row and column drive switches 416, 418 can be arranged in series such that both the row switch 416 and the column switch 418 must be enabled for a signal to be sent to the acoustic sensor 400.

In this manner, when the acoustic sensor 400 should be driven, the row and column drive switches 416, 418 can be enabled and, in response, the transducer 410 can generate an acoustic output corresponding to the voltage signal supplied by the buffer 406.

The sense portion 404 can also include row and column sense switches 420, 422 (respectively). As with the drive portion 402, the acoustic sensor 400 can be one of many individual sensors defining an acoustic imaging array. Accordingly, the row and column sense switches 420, 422 can be used in order to independently address a particular sensor from the array of many individual sensors. The row and column sense switches 420, 422 can be arranged in series such that both the row switch 420 and the column switch 422 must be enabled for a signal to be read from the acoustic sensor 400.

Once the row and column sense switches 420, 422 are enabled, voltage output from the transducer 410 can pass through both the row and column sense switches 420, 422 to set the voltage of the gate of an amplifier 424. The amplifier 424 can be implemented as any type of controllable gain or fixed gain amplifier. For example, as illustrated, the amplifier 424 is implemented as a common source amplifier, although this configuration is not required and other amplifier topologies are possible.

The output from the amplifier 424 can thereafter be read by the acoustic imaging system as a signal corresponding to the present acoustic signals received by the transducer 410. As one example, when the transducer 410 receives an acoustic signal (e.g., from an acoustic reflection), the transducer 410 can generate a voltage bias across its terminals. This voltage can thereafter be amplified by the amplifier 424.

In some embodiments, the output voltage of the amplifier 424 can be biased. For example, an output biasing circuit can be used to supply the output of the amplifier with a direct current bias. In other examples, a ground node of the sense portion 404 can be upwardly-biased during a ground shifting operation.

In many embodiments, the drive portion 402 can be entirely disabled while the sense portion 404 is operating. As one example, the drive portion can be shorted (e.g., Vcc set to the same potential as ground). In this manner, while the sense portion 404 is sensing and amplifying any electrical signals from the transducer 410, the drive portion 402 does not present as a load to the sense portion 404.

Similarly, the sense portion 404 can be disabled while the drive portion 402 is operating. In many cases, disabling the sense portion 404 can be accomplished by disabling the respective row and column sense switches 420, 422. Similarly, during a sense cycle, the row and column drive switches 416, 418 can be disabled.

In many embodiments, the drive portion 402 can be entirely disabled while the sense portion 404 is operating. As one example, the drive portion can be shorted (e.g., Vcc set to the same potential as ground). In this manner, while the sense portion 404 is sensing and amplifying any electrical signals from the transducer 410, the drive portion 402 does not present as a load to the sense portion 404.

Similarly, the sense portion 402 can be disabled while the drive portion 402 is operating. As noted above, portions of the sense portion 402 (e.g., row and column selection switches 416, 418, amplifier 420) can be damaged by any high voltage signals. Accordingly, in many embodiments, before the drive portion 402 begins operating, the voltage source and ground node of the sense portion can be raised.

For example, if the drive portion 402 is configured to send a 100 volt pulse into the transducer 410, the ground node of the low voltage portion 404 can be set to be 100 volts. Correspondingly, the voltage source Vcc of the sense portion 404 can be set to 100 volts. In some embodiments, the voltage source Vcc can be set slightly higher than 100 volts to provide a slight voltage range buffer. In this manner, when Vcc and the ground node are set to 100+ volts and 100 volts respectively, the potential difference across all components of the sense portion 404 is small enough to be within the voltage tolerance of the sense portion 404. For example, in some embodiments Vcc of the low-voltage portion 404 can be set to 103.3 volts and the ground node can be set to 100 V. In this manner, the voltage difference across the amplifier 424 can be 3.3 volts.

Certain embodiments can set the potential of the voltage sources (Vcc) and ground references (GND) of the high voltage and sense portions in the manner such as shown in TABLE 1, below:

TABLE 1

|  | Sense Mode | Drive Mode |
|---|---|---|
| Vcc (High voltage) | 0 volts | 100 volts |
| Vcc (Low voltage) | 3.3 volts | 103.3 volts |
| GND (High voltage) | 0 volts | 0 volts |
| GND (Low voltage) | 0 volts | 100 volts |

Figure 4B:
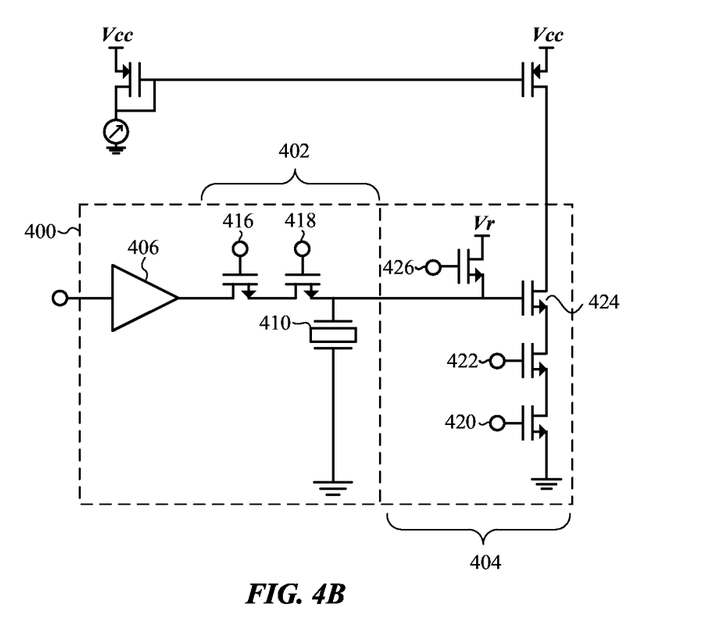
FIG. 4B depicts another simplified schematic diagram of an acoustic sensor.

FIG. 4B depicts another simplified schematic diagram of an acoustic sensor. In this embodiment, the row and column sense switches 420, 422 can be re-positioned to be coupled to the source of the amplifier 424. Additionally, a reset switch can be coupled to the gate of the amplifier 424 in order to reset the voltage thereof. For example, the gate voltage of the amplifier 424 can be reset when the acoustic sensor 400 transitions from a drive mode to a sense mode.

Figure 5:
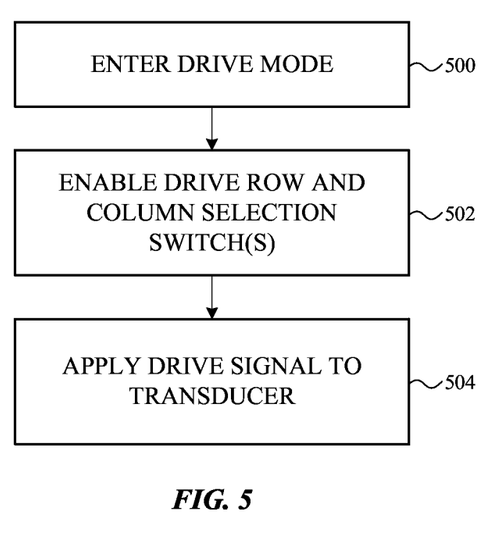
FIG. 5 depicts example operations of a method of driving an acoustic sensor.

FIG. 5 depicts example operations of a method of driving an acoustic sensor. The method can begin at operation 500 in which a drive mode can be enabled for a particular acoustic sensor. Thereafter, at operation 502, a drive row and a drive column switch associated with the acoustic sensor can be enabled. Thereafter, at operation 504, a voltage drive signal can be applied to the acoustic sensor.

Figure 6:
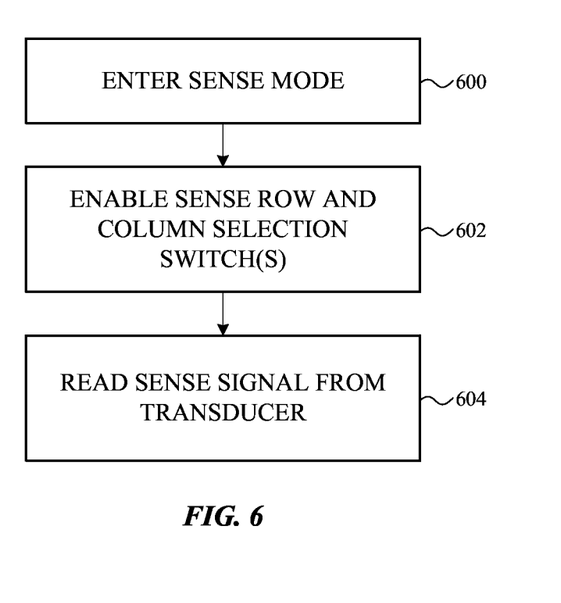
FIG. 6 depicts example operations of a method of sensing acoustic signals with an acoustic sensor.

FIG. 6 depicts example operations of a method of driving an acoustic sensor. The method can begin at operation 600 in which a sense mode can be enabled for a particular acoustic sensor. Thereafter, at operation 602, a sense row and a sense column switch associated with the acoustic sensor can be enabled. Thereafter, at operation 604, a voltage signal can be read from the acoustic sensor.

Many embodiments of the foregoing disclosure may include or may be described in relation to various methods of operation, use, manufacture, and so on. Notably, the operations of methods presented herein are meant only to be exemplary and, accordingly, are not necessarily exhaustive. For example an alternate operation order or fewer or additional steps may be required or desired for particular embodiments.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not meant to be exhaustive or to limit the embodiments to the precise forms disclosed. It will be apparent to one of ordinary skill in the art that many modifications and variations are possible in view of the above teachings. In particular, any features described with respect to one embodiment may also be used in some embodiments, where compatible. Likewise, the features of the different embodiments may be exchanged, substituted, or omitted where compatible and appropriate.

The present disclosure recognizes that personal information data, including biometric data, in the present technology, can be used to the benefit of users. For example, the use of biometric authentication data can be used for convenient access to device features without the use of passwords. In other examples, user biometric data is collected for providing users with feedback about their health or fitness levels. Further, other uses for personal information data, including biometric data, that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure, including the use of data encryption and security methods that meets or exceeds industry or government standards. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data, including biometric data. That is, the present disclosure contemplates that hardware and/or software elements can be provided to prevent or block access to such personal information data. For example, in the case of biometric authentication methods, the present technology can be configured to allow users to optionally bypass biometric authentication steps by providing secure information such as passwords, personal identification numbers (PINS), touch gestures, or other authentication methods, alone or in combination, known to those of skill in the art. In another example, users can select to remove, disable, or restrict access to certain health-related applications collecting users' personal health or fitness data.

We claim:

1. A fingerprint imaging system comprising:
a high voltage source;
a low-voltage sense circuit; and
an array of acoustic elements, each acoustic element comprising:
 a piezoelectric transducer comprising:
  a drive/sense lead; and
  a ground lead coupled to a circuit ground;
 a pair of row/column drive selection switches coupled in series and configured to couple the drive/sense lead of the piezoelectric transducer to the high-voltage source when the acoustic element is operated in a high-voltage drive mode; and
 a pair row/column sense selection switches coupled in series and configured to:
  couple the drive/sense lead of the piezoelectric transducer to the low-voltage sense circuit when the acoustic element is operated in a low-voltage sense mode; and
  decouple the drive/sense lead of the piezoelectric transducer from the low-voltage sense circuit when the acoustic element is operated in the high-voltage drive mode.

2. The fingerprint imaging system of claim 1, wherein each acoustic element of the array of acoustic elements are coupled to a bottom surface of a substrate.

3. The fingerprint imaging system of claim 2, wherein the substrate is formed with one of the group consisting of glass, sapphire, and metal.

4. The fingerprint imaging system of claim 1, wherein each piezoelectric transducer of each acoustic element is formed from a material configured to expand and contract in response to the high-voltage signal.

5. The fingerprint imaging system of claim 1, wherein the high voltage source is configured to output a signal with a direct current bias of approximately 100 volts.

6. The fingerprint imaging system of claim 5, wherein the low-voltage sense circuit is coupled to a low voltage source configured output less than 10 volts.

7. The fingerprint imaging system of claim 1, wherein the high voltage source comprises a common electrode coupled to each acoustic element of the array of acoustic elements.

8. The fingerprint imaging system of claim 1, wherein the voltage sense circuit comprises a common electrode coupled to each piezoelectric transducer of each acoustic element of the array of acoustic elements.

9. The fingerprint imaging system of claim 8, wherein the common electrode comprises a conductive plate.

10. A method of driving an acoustic element of a fingerprint imaging sensor comprising an addressable drive circuit, the method comprising:
 opening each of a row sense select switch and column sense select switch that are coupled in series to disconnect a drive lead of the acoustic element from a low-voltage sense circuit;
 closing each of a row drive select switch and column drive select switch in series to connect the drive lead the acoustic element to a high-voltage source through the addressable drive circuit; and
 driving the acoustic element with a high-voltage signal generated by the high-voltage source; wherein:
 a ground lead of the acoustic element is coupled to a circuit ground.

11. The method of claim 10, wherein the acoustic element comprises an piezoelectric transducer formed from a material configured to expand and contract in response to the high-voltage signal.

12. The method of claim 10, wherein the high-voltage source is configured to output approximately 100 volts.

13. The method of claim 12, wherein the low-voltage sense circuit is coupled to a low voltage source configured to output approximately 3.3 volts.

14. The method of claim 10, wherein the acoustic element is coupled to a bottom surface of a substrate.

15. The method of claim 14, wherein the substrate is formed with one of the group consisting of glass, sapphire, and metal.

16. A method of reading an acoustic element of a fingerprint imaging sensor comprising an addressable read circuit and an addressable drive circuit, the method comprising:
 opening each of a row sense select switch and column sense select switch that are coupled in series to disconnect a sense/drive lead of the acoustic element from a low-voltage sense circuit;
 closing each of a row drive select switch and column drive select switch that are coupled in series to connect the sense/drive lead of the acoustic element to a high-voltage source through the addressable drive circuit;
 opening each of the row drive select switch and column drive select switch to decouple the acoustic element from the high-voltage source;
 enabling each of the row sense select switch and column sense select switch to couple the acoustic element to the addressable read circuit; and
 obtaining an electrical signal from the acoustic element with the addressable read circuit; wherein:
 a ground lead of the acoustic element is coupled to a circuit ground.

17. The method of claim 16, wherein the acoustic element comprises an piezoelectric transducer formed from a material configured to generate an electrical signal in response to mechanical pressure.

18. The method of claim 16, wherein the high-voltage drive circuit is configured to output a voltage signal having a direct current bias of approximately 100 volts.

19. The method of claim 16, wherein the low-voltage sense circuit is coupled to a low voltage source configured to output approximately 3.3 volts.

* * * * *